Patented June 19, 1928.

1,674,232

UNITED STATES PATENT OFFICE.

HARRY TODD, OF LINTHORPE, MIDDLESBOROUGH, ENGLAND.

COMPOSITION FOR PERMANENT MOLDS FOR METAL CASTING.

No Drawing. Application filed October 14, 1926, Serial No. 141,673, and in Great Britain November 9, 1925.

This invention has reference to compositions for permanent molds for metal casting, i. e. rigid mold parts constructed to withstand repeated castings therefrom.

The object of the invention is to provide a composition of the foregoing nature which shall be serviceable after many repetitions of use. The material allows passage of air and gases at the time of pouring, whilst it is sufficiently compact to resist the pressure of the liquid metal and prevent its exudation. It withstands very high temperatures and gives a clear, smooth surface to the casting. It is strong and tough.

According to my invention I use a composition comprising a mixture of sillimanite with plaster of Paris, and a fibrous hair or equivalent constituent, (the latter as well known for molding compositions, with or without other ingredients, and I have found that this possesses the highly desirable qualities stated.

Sillimanite, sometimes referred to as fibrolite, is a highly refractory alumino-silicate, with a melting point well over 1800 degrees Cent. I prefer to use this in the proportion by volume of from about 40 to 85 per cent of the total composition, varying according to what other materials (commonly known in the molder's art) are included in the composition, as would be readily determined by those versed in the art to meet different requirements, e. g. molding high and low temperature metals, thickness of casting and so forth. In some circumstances I add a suitable sand bearing a mineral of the rare earths, such as monazite sand (silicate of zirconium), and its proportion of the total composition, when used, is in the neighbourhood of 20–30 per cent by volume.

To complete a composition including the foregoing, I may add a proportion of coke dust, coal dust, charcoal powder or equivalent; cow hair, asbestos fibre, or equivalent would do for the fibrous constituent aforesaid; and a proportion of ganister and china clay or good fireclay might sometimes be added. The coke dust (or its equivalent), ganister, sand and clay may be omitted altogether. All these materials are well known as mold constitutents, and plaster of Paris has also been proposed as a binder in molds for anatomical castings.

By way of example I will set forth some satisfactory compositions according to my invention, and method of preparing same for the mold, although it will be appreciated by studying the examples that the proportions (which are by volume) may be varied within fairly wide limits. For instance, in Examples "B" and "C", it will be seen that with the same constituents, the sillimanite and monazite sand are reduced about 5 per cent at the gain of all the other constituents varied approximately proportionately. They would be increased at the expense of the other constituents.

*Example "A".*

| | |
|---|---:|
| Sillimanite, | 85 |
| Plaster of Paris, | 8 |
| Asbestos fibre, | 7 |
| | 100 |

*Example "B".*

| | |
|---|---:|
| Sillimanite, | 45 |
| Monazite sand, | 25 |
| Coke dust, | 10 |
| Cow hair, | 2 |
| Ganister, | 10 |
| Plaster of Paris, | 5 |
| China clay, | 3 |
| | 100 |

*Example "C".*

| | |
|---|---:|
| Sillimanite, | 40 |
| Monazite sand, | 21 |
| Coke dust, | 13 |
| Cow hair, | 3 |
| Ganister, | 13 |
| Plaster of Paris, | 6 |
| China Clay, | 4 |
| | 100 |

*Example "D".*

| | |
|---|---:|
| Sillimanite, | 54 |
| Monazite sand, | 30 |
| Asbestos fibre, | 3 |
| Plaster of Paris, | 8 |
| China clay, | 5 |
| | 100 |

Referring to the Examples "B" and "C", the sillimanite monazite sand and ganister (latter preferably fired silica brick 95 per cent best fireclay 5 per cent) are ground to pass a $\frac{1}{32}''$ mesh in a dry state. In Example "A" the sillimanite would be ground alone, and in Example "D" with the sand. All the constituents are then mixed together, and whilst mixing there is added a water solution of sodium silicate till the mixture is in a moist and workable state i. e. will ball well when tightly squeezed in the hands.

The composition is very tightly and evenly rammed on to the face of the pattern to a depth or thickness according to the character of the casting to be made.

The backing material of the mold could consist of medium strong sand, well rammed, and with plenty of irons, rods or the like for reinforcement.

The mold is then dried in a stove, for preference at a steady rising temperature to 500 degrees Cent. for 12 hours or more, according to size of mold, and then allowed to gradually cool off to a heat suitable to take an even coating of mineral blacking (wet) finished off with a camel hair brush. When entirely free from steam or dampness, the mold is ready for use.

The composition can be employed for repairing molds, avoiding, however, too much water.

As the proportions are by volume, it is pointed out that the volume of hair or fibre is reckoned when it is pressed by hand.

I claim:—

A composition for permanent molds comprising a mixture of sillimanite and monazite sand in the proportions of 45 per cent and 25 per cent, respectively, and a binder of cow hair, plaster of Paris, china clay and ganister.

In testimony whereof I have affixed my signature hereto this 29th day of September, 1926.

HARRY TODD.